United States Patent
Kim et al.

(10) Patent No.: US 8,149,658 B2
(45) Date of Patent: Apr. 3, 2012

(54) METHOD OF ERASING DATA FROM OPTICAL DISC

(75) Inventors: Hansuk Kim, Pyeongtaek-si (KR); Sung Gul Lee, Pyeongtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 599 days.

(21) Appl. No.: 11/939,363

(22) Filed: Nov. 13, 2007

(65) Prior Publication Data

US 2008/0130477 A1 Jun. 5, 2008

(30) Foreign Application Priority Data

Nov. 14, 2006 (KR) .................. 10-2006-0112171
Nov. 14, 2006 (KR) .................. 10-2006-0112176

(51) Int. Cl.
 *G11B 7/00* (2006.01)
(52) U.S. Cl. .................................................. 369/47.13
(58) Field of Classification Search .............. 369/292
 See application file for complete search history.

(56) References Cited

U.S. PATENT DOCUMENTS

| | | | | |
|---|---|---|---|---|
| 4,953,150 A * | 8/1990 | Sonobe | ........................ | 369/13.24 |
| 5,175,716 A * | 12/1992 | Min | .......................... | 369/44.11 |
| 5,216,658 A * | 6/1993 | Clark | ............................ | 369/100 |
| 5,583,712 A * | 12/1996 | Brunelle | .................... | 360/77.07 |
| 6,693,861 B1 * | 2/2004 | Lim | ........................... | 369/44.28 |
| 6,834,034 B2 * | 12/2004 | Yokokawa | ................ | 369/53.22 |
| 2002/0105862 A1 * | 8/2002 | Lee | ............................ | 369/30.05 |
| 2004/0257957 A1 * | 12/2004 | Kim | ........................ | 369/112.02 |
| 2005/0265194 A1 * | 12/2005 | Wu | ............................. | 369/53.25 |

FOREIGN PATENT DOCUMENTS

| JP | 04-167227 A | 6/1992 |
|---|---|---|
| JP | 2003-272171 A | 9/2003 |
| JP | 2003-272172 A | 9/2003 |

* cited by examiner

*Primary Examiner* — Peter Vincent Agustin
(74) *Attorney, Agent, or Firm* — Birch, Stewart, Kolasch & Birch, LLP

(57) ABSTRACT

A method and device for erasing data from an optical disc, are discussed. In an embodiment of the present invention, the area of the optical disc where data has been written is overwritten with arbitrary data using a beam spot spanning over two or more radially adjacent tracks. The beam spot can be formed by adjusting a location of an objective lens to a defocused location, and the power of the laser beam can be increased so as to maintain a certain power level. The beam spot is moved from the inner circumference of the optical disc to the outer circumference under feed-forward control over an actuator and a sled motor, in which case the beam spot may be moved sequentially toward the outer circumference in steps of beam spot size or be moved repeatedly across radially adjacent tracks in a zigzag manner by the actuator and/or the sled motor.

24 Claims, 10 Drawing Sheets

Shape of marks recorded on tracks

Original data destroyed by overwriting in defocused state

METHOD OF ERASING DATA FROM OPTICAL DISC

This application claims the priority benefit of Korean Patent Application No. 10-2006-0112176 filed on Nov. 14, 2006, and Application No. 10-2006-0112171 filed on Nov. 14, 2006, which are hereby incorporated by reference as if fully set forth herein.

BACKGROUND OF THE INVENTION

1. Field of the Invention

The present invention relates generally to a method of erasing data from an optical disc, and, more particularly, to a method and device for efficiently erasing data that is recorded on an optical disc that can be written once such as a Write Once Read Many (WORM) disc.

2. Description of the Related Art

After Compact Discs (CDs), that is, optical recording media capable of recording 74 minutes of music or about 650 Mbytes of data, were commercialized, Digital Versatile Discs (DVDs) capable of recording a 2-hour Standard Definition (SD)-class movie were widely commercialized, and Blu-ray Discs (BDs) and High-Density Digital Versatile Discs (HD-DVDs) capable of recording a High Definition (HD)-class movie will appear on the market in the near future.

Optical recording media, such as CDs, DVDs and BDs, are disc-shaped media for recording data using optical characteristics, and data can be written on the discs and read from the discs using optical pickups. Optical recording media include recorded discs for reproduction on which data is recorded already, and discs for recording, such as CD-R/RW, DVD-R/+R/-RW/+RW/RAM and BD-R/-RE media, that can be written or rewritten.

Among the discs for recording, discs such as CD-R and DVD-R/+R media are WORM discs, meaning that they can be written once and do not support the modification or deletion of previously stored data, from the aspect of disc specifications.

Accordingly, methods of preventing WORM discs, which store sensitive data not to be exposed to the outside, from being read or methods of deleting such data from the WORM discs have been proposed.

As an example, as shown in FIG. 1, there is a method of overwriting only navigation information stored in the Lead In Area (LIA) of an optical WORM disc and only file system information stored in the File System Information Area (FMIA) of the optical WORM disc with arbitrary null data.

As a result, the navigation information and file system information, necessary to control the reading of the data stream stored in the data area of the optical WORM disc, cannot be used further, which has the effect of the data stream recorded in the data area of the optical disc being indirectly erased or not accessible.

There is another method of achieving the effect of deleting a data stream stored in the data area of an optical disc by deleting only an encryption key necessary for decryption of the encrypted data stream into the original data stream by overwriting the encryption key with arbitrary null data, in the case where the data stream is recorded in the data area of an optical WORM disc in an encrypted state, as shown in FIG. 2.

Still in another method, a user forms scratches on an optical disc, particularly in the LIA thereof, using a mechanical tool, or an optical disc is physically damaged using a heater or a compressor, as shown in FIG. 3, has been proposed.

However, in the above case where only the navigation information and file system information, or only the encryption key is erased, a problem arises in that a data stream recorded in the data area of the disc still exists without change, so that the data stream may be leaked through hacking or the like. In the other case where the optical disc is damaged using a mechanical tool, a heater, or a compressor, problems arise in that inconvenience in use is caused and additional high-cost equipment may be required.

SUMMARY OF THE INVENTION

Accordingly, the present invention has been made keeping in mind the above and other problems and limitations associated with the related art, and an object of the present invention is to provide a method and device for reliably and efficiently deleting data from an optical WORM disc.

In order to accomplish the above and other objects, the present invention provides according to one embodiment a method of erasing data from an optical disc, including the step of overwriting the area of the optical disc where data has been written, with arbitrary data using a beam spot spanning over two or more radially adjacent tracks (tracks are also referred to herein as track laps).

In an embodiment of the present invention, the beam spot may be formed by adjusting a location of an objective lens to a defocused location, and it may be necessary to increase the power of the laser beam.

In an embodiment of the present invention, the beam spot may be moved under feed-forward control over an actuator and a sled motor, in which case the beam spot may be moved spirally and sequentially toward the outer circumference or may be moved toward the outer circumference in steps of beam spot size.

In the latter case, the beam spot may be moved to the next radial location after the optical disc has performed one or more rotations at a current radial location, or may be moved to the next radial location in a state in which the length of the arc of a concentric circle at a current radial location that the beam spot does not travel is smaller than the length of an arc corresponding to a smallest unit data block on which error correction is performed.

If the optical disc rotates at a constant angular velocity, the power of the laser beam may be increased in proportion to a radius corresponding to a radial location at which the beam spot is positioned as the beam spot is moved toward the outer circumference.

The beam spot may be moved toward the outer circumference within a range of travel of the actuator by the actuator, and may be moved toward the outer circumference by the sled motor when the actuator is out of the range of travel.

Alternatively, the beam spot may be moved repeatedly across radially adjacent track laps by the sled motor. Or the beam spot may be moved across radially adjacent track laps within a range of travel of the actuator in a zigzag manner by the actuator, and may be moved toward the outer circumference by the range of travel by the sled motor. In the former case, the beam spot, in addition, may be moved repeatedly in a horizontal direction within a range of travel of the actuator by the actuator, and may be moved toward inner circumference after being moved to a location at which data was last recorded based on a current radial location calculated from the accumulated number of rotations of the sled motor. In the latter case, if the optical disc rotates at a constant angular velocity, a velocity at which the beam spot is moved in a zigzag manner is increased as the beam spot is moved toward the outer circumference.

If a current radial location calculated based on the accumulated number of rotations of the sled motor has passed through a location at which data was last recorded, the overwriting operation may be terminated. The location at which data was last recorded may be searched for in navigation information of the optical disc.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
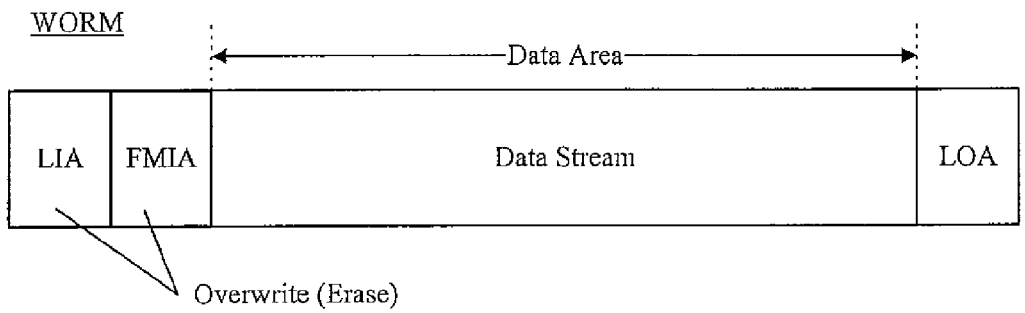
FIGS. 1 to 3 show examples of related art methods of erasing data from an optical disc.
Figure 2:
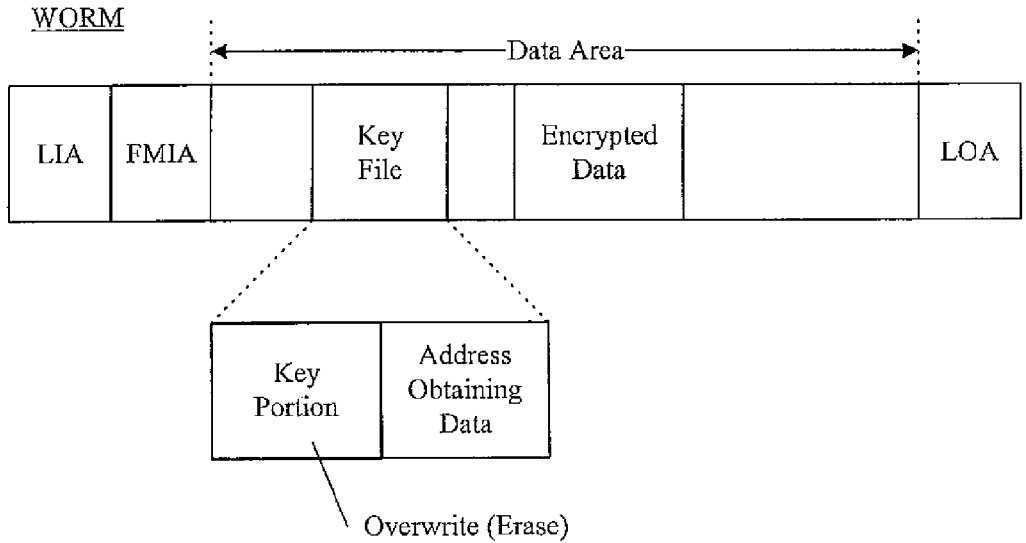
Figure 3:
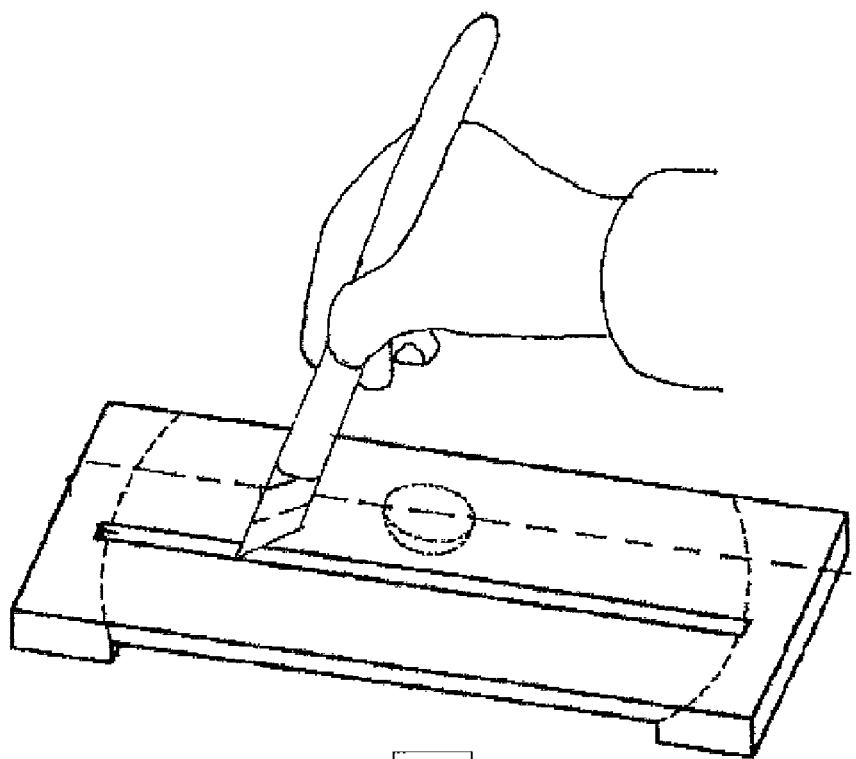
Figure 3:
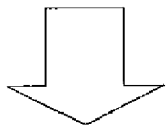
Figure 3:
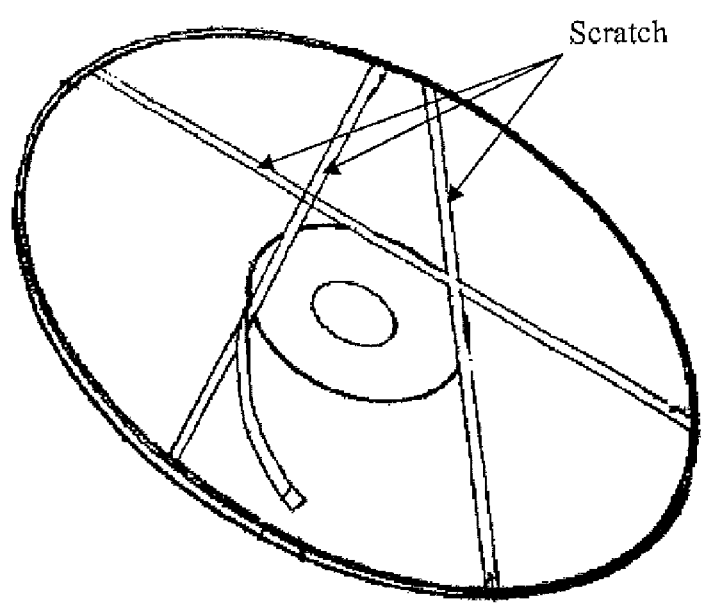

Reference now should be made to the drawings, in which the same reference numerals are used throughout the different drawings to designate the same or similar components.

Preferred embodiments of a method and device for erasing data from an optical disc according to the present invention are described in detail below with reference to the accompanying drawings.

In a WORM disc, such as CD-R, DVD-R, DVD+R and BD-R media, marks (or pits) are formed by heating the dye of a recording layer using a laser beam, and Radio Frequency (RF) signals are created by the reflectance difference between marks and mirrors (areas between marks where marks are not formed). If the recording layer of a WORM disc, on which data has been recorded once, is heated again, already formed marks and mirrors are changed, so that original RF signals are lost. Accordingly, an optical disc apparatus generally does not allow rewriting in the previously recorded area of a WORM disc.

In the present invention, in order to erase data recorded on a WORM disc, arbitrary data is written in the area (e.g., data area of the disc) where data is recorded, in which case data recorded onto a plurality of radially adjacent track laps can be simultaneously erased by enlarging the focus size of a laser beam formed on a recording layer.

Data may be erased by overwriting an area where the data has been written, with arbitrary data using a beam having a focus size that is used to write data along a track, in which case only data recorded in a single track lap is erased at one time, so that it takes a lot of time to erase all of the recorded data. Thus, according to an embodiment of the present invention, a plurality of radially adjacent track laps are simultaneously influenced by enlarging the focus size of a laser beam, thereby reducing the time that is taken to erase data.

In this case, in order to maintain a recording power level, when the focus size is increased n times, the power of a laser beam must be increased $n^2$ times.

Furthermore, in the case of simultaneously writing data in a plurality of radially adjacent track laps by increasing the focus size of a beam, a tracking error signal cannot be obtained, so that a feedback type tracking servo using error signals cannot be implemented. Thus, according to an embodiment of the present invention, by controlling an actuator for supporting an objective lens and a sled motor for moving an optical pickup to the inner circumference and outer circumference of an optical disc in a feed-forward manner, arbitrary meaningless data is recorded while the movement is made sequentially or stepwise to the last portion of the area in which data has been written in a direction from the inner circumference of the disc to the outer circumference.

Figure 4:
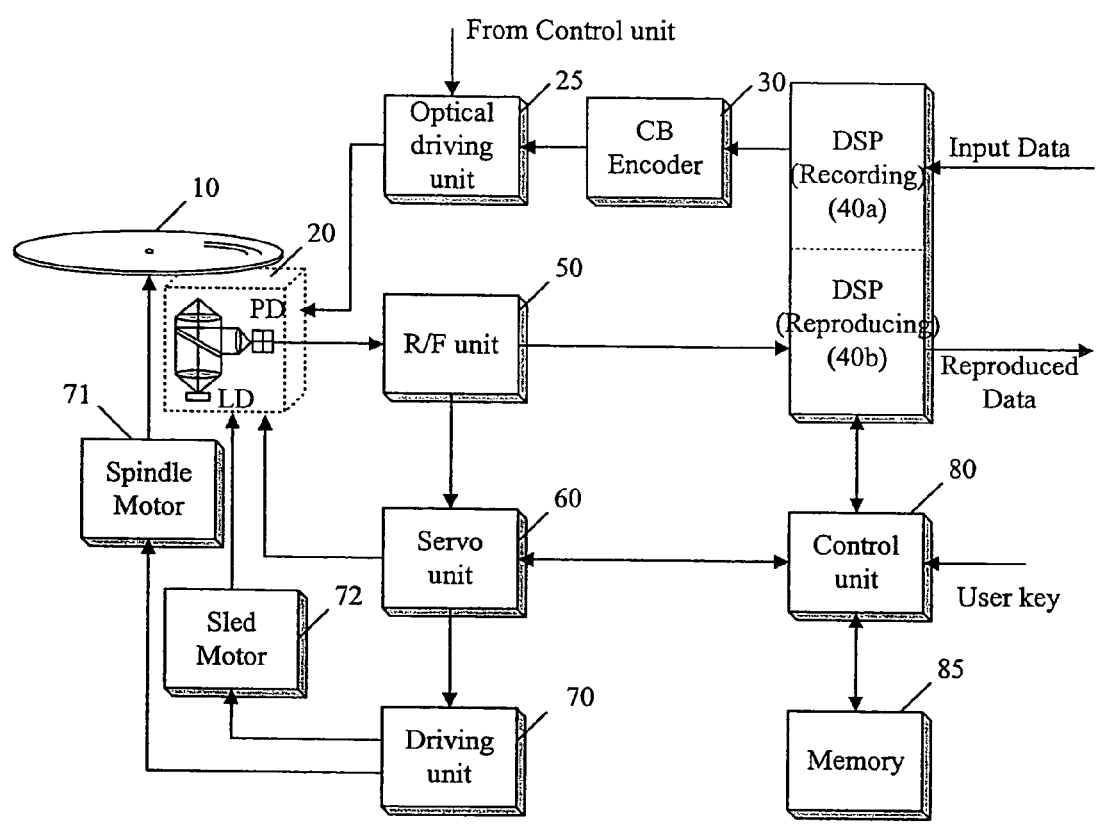
FIG. 4 shows the construction of an optical disc apparatus to which the present invention is applied according to an embodiment of the present invention.

FIG. 4 shows the construction of an optical disc apparatus to which the present invention is applied. The optical disc apparatus, such as a DVD recorder/player or other disc player/recorder, may include an optical pickup 20, an optical driving unit 25, a channel bit encoder 30, a recording/playback signal processing unit 40 (DSP recording unit 40a, DSP reproducing unit 40b), an RF unit 50, a servo unit 60, a driving unit 70, a spindle motor 71, a sled motor 72, a control unit 80, and memory 85. The optical disc apparatus can include other components such as a display unit. All components of the optical disc apparatus are operatively coupled and configured.

Figure 5:
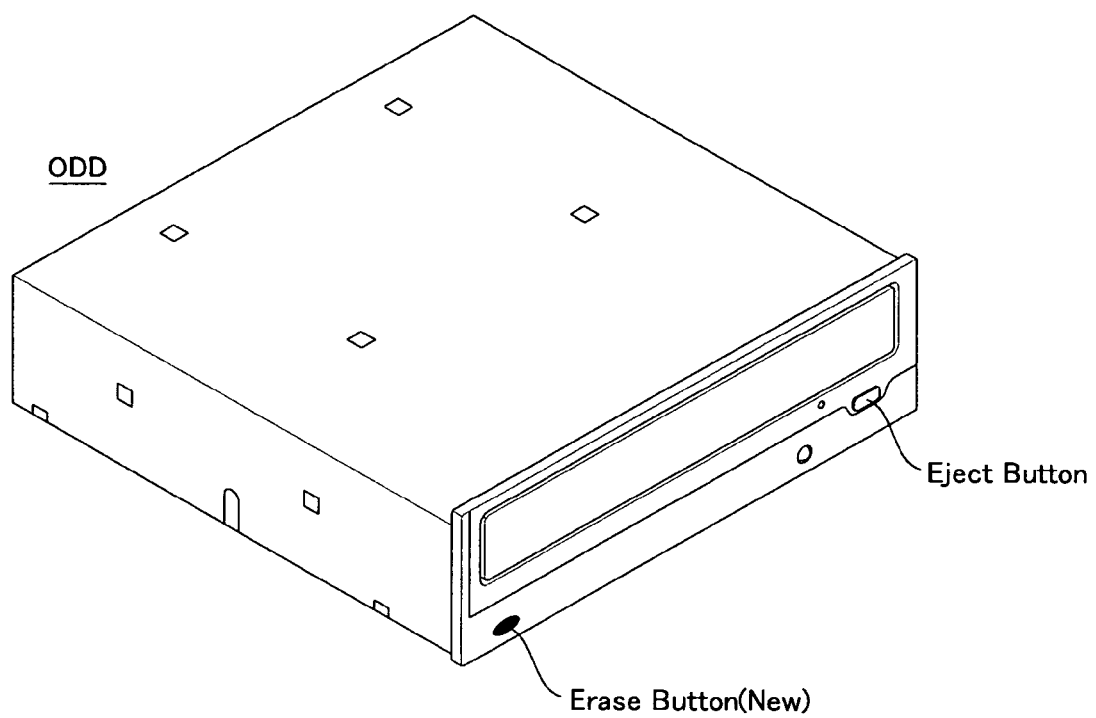
FIG. 5 shows an embodiment in which an erase button is mounted on an optical disc apparatus according to the present invention.

The optical disc apparatus may be provided with an erase button, in addition to an eject button, for example, as shown in FIG. 5. As an example, when the erase button is manipulated, the control unit 80 sets the operation mode of the optical disc apparatus to an erase mode for erasing data written on a WORM disc.

Figure 6:
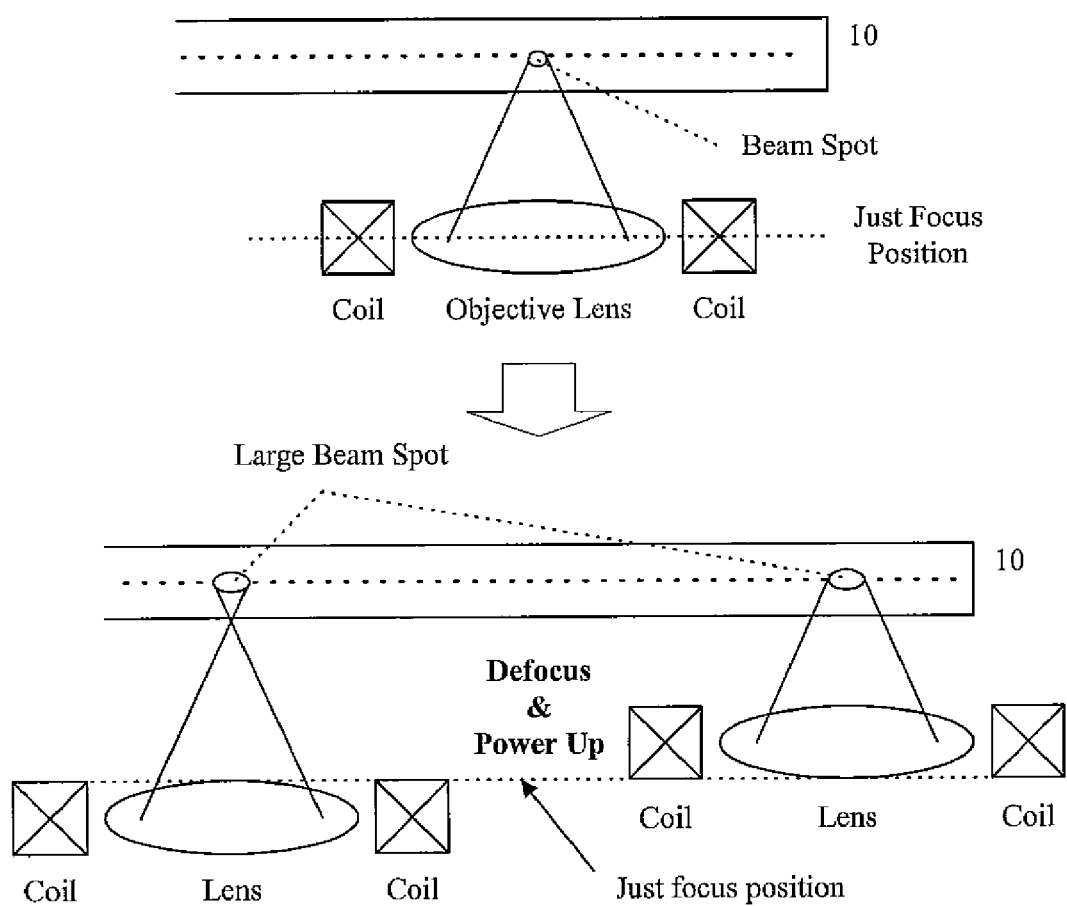
FIG. 6 shows an embodiment in which the location of an objective lens is adjusted to a defocused location so as to form a large beam spot.

Furthermore, the control unit 80 controls the servo unit 60, thereby applying offset to a focusing servo so that a large beam spot spanning over a plurality of adjacent track laps, for example, two or more adjacent track laps, of an optical disc is formed on the recording layer of the disc, so that a defocused state is established. The location of the objective lens included in the optical pickup 20 is adjusted according to the offset. As shown in FIG. 6, a defocused state may be established close to a disc or far from the disc, according to the direction of the offset.

The control unit 80 controls the optical driving unit 25, thereby increasing the output power value of a laser diode LD included in the optical pickup 20, so that the power value of the laser beam is not reduced. This ensures that energy radiated on the unit area of a recording layer of the disc is not reduced, even if the size of a beam spot is increased. As an example only, when the size of a beam spot increases two times, the output power value of an LD must be increased 4 times.

Figure 7:
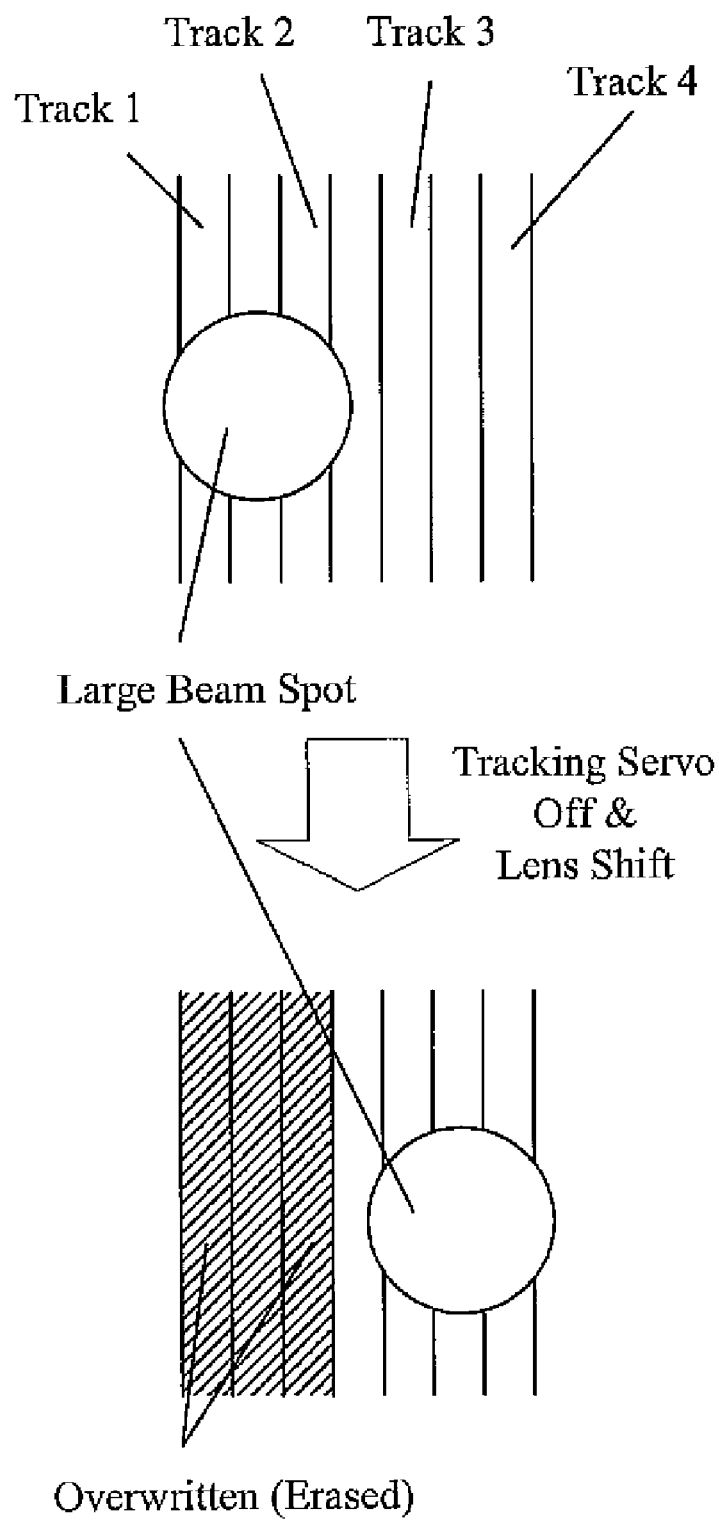
FIG. 7 shows an embodiment in which data is erased while a beam spot is moved toward the outer circumference of an optical disc in steps of a predetermined amount.

The control unit 80 controls the servo unit 60, thereby performing an operation of erasing data while shifting the objective lens from the inner circumference of the disc to the outer circumference in steps of a specific amount in the state in which the tracking servo is turned off, as shown in FIG. 7. In this case, a beam spot having a large size spanning over a plurality of radially adjacent track laps is placed on the recording layer of the optical disc 10, and then the area where data has been written is overwritten with arbitrary data or null data. This will be described in detail below.

Figure 8:
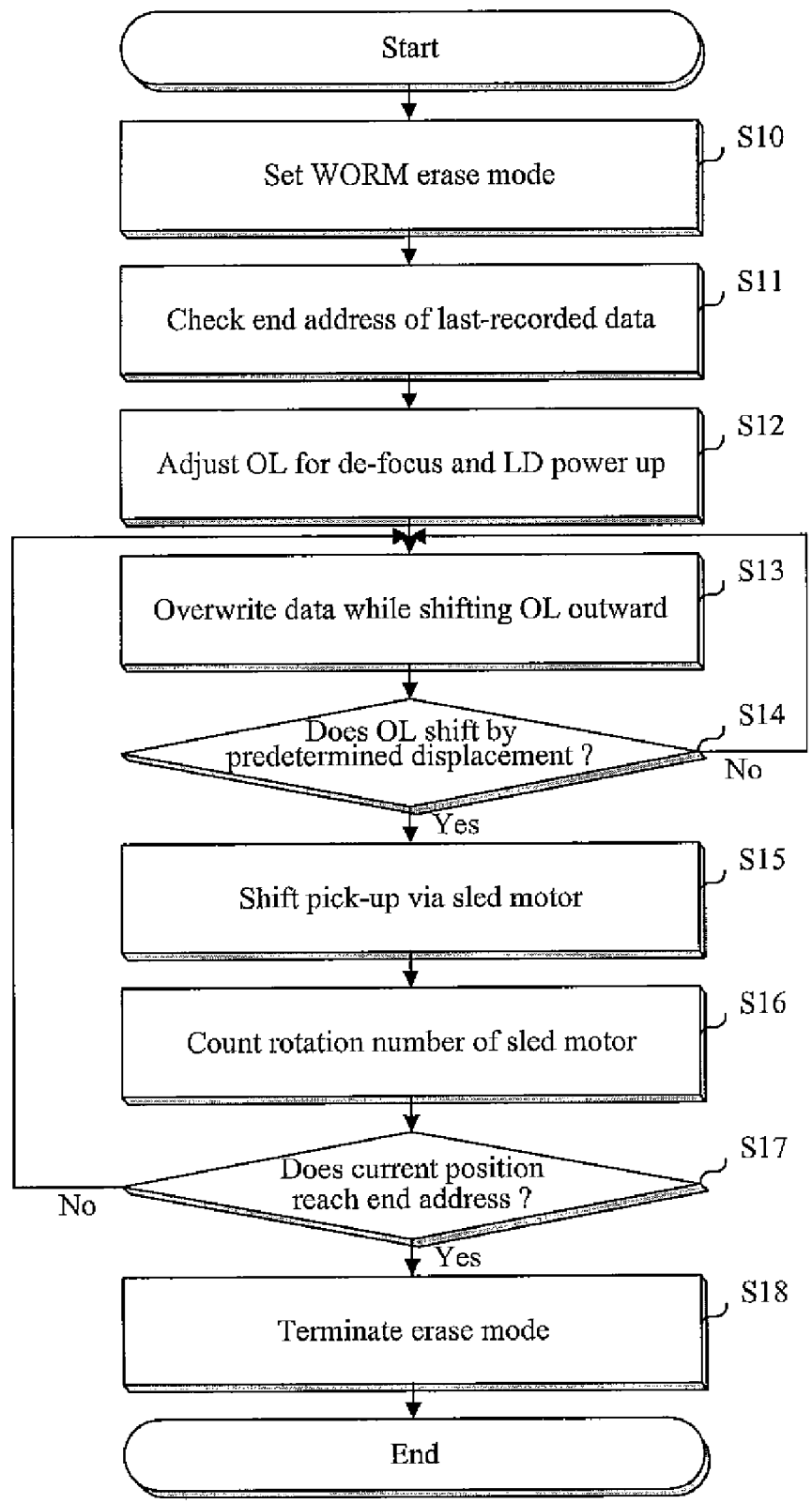
FIG. 8 is a flowchart showing a method of erasing data from an optical disc according to an embodiment of the present invention.

FIG. 8 is a flowchart showing a method of erasing data from an optical disc according to an embodiment of the present invention. This method is described as being implemented by the optical disc apparatus of FIGS. 4 and 5, but can be implemented by other suitable devices.

When the erase button mounted on the optical disc apparatus ODD is manipulated, and thus an erase command is inputted, the control unit 80 sets a data erase mode for an optical disc even if an optical WORM disc is inserted into the apparatus at step S10.

Thereafter, the control unit 80 searches navigation information recorded in the optical disc, for an end address indicating the location of the data area of the optical disc, in which data was last recorded, and can calculate an approximate radius for the location where the last data was recorded based on the found end address at step S11.

Thereafter, the control unit 80 controls the servo unit 60, thereby adjusting the objective lens (OL) of the optical pickup 20 so as to establish a defocused state, as described above with reference to FIG. 6, and controls the optical driving unit 25, thereby increasing the output power of the laser diode LD at step S12.

Thereafter, the control unit 80 controls the servo unit 60, thereby overwriting the data area with null data or arbitrary data using the large beam spot while moving the objective lens from the inner circumference of the disc to the outer circumference in the state in which the tracking servo is turned off at step S13.

In the optical disc, a track on which data is recorded runs spirally and continuously from the inner circumference of the optical disc to the outer circumference. When the tracking servo is turned on, the objective lens follows the track and moves from the inner circumference of the disc to the outer circumference. However, in the present invention, a beam spot is formed on the recording layer in a defocused state, therefore a tracking error signal cannot be obtained. Accordingly, a feedback-type tracking servo using error signals cannot be performed, but the objective lens is moved from the inner circumference of the disc to the outer circumference in a feed-forward manner in the state in which the tracking servo is turned off.

A method of moving the objective lens from the inner circumference of the disc to the outer circumference so as to erase data may be a method of sequentially moving the objective lens along a spiral path that is similar to the track, or a method of moving the objective lens to the next radial location after one or more rotations along a concentric circle at a corresponding radial location. In order to move the objective lens along a spiral path, as in the former method, it is necessary to precisely control the actuator, the sled motor and the spindle motor, which is not an easy operation in the feed-forward control method.

Figure 9:
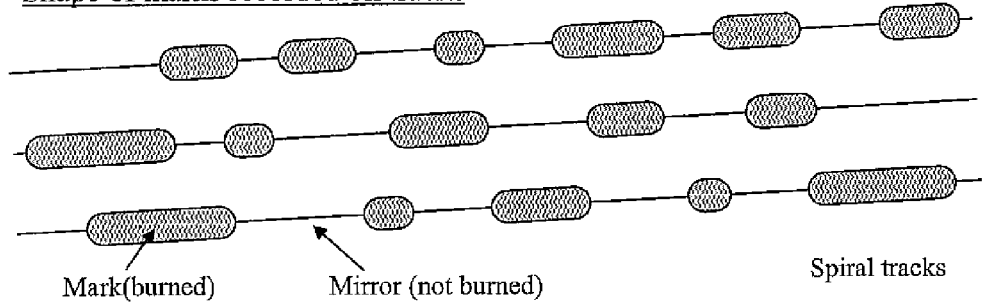
FIG. 9 shows an embodiment in which data is erased while a large beam spot is moved along a concentric circle.
Figure 9:
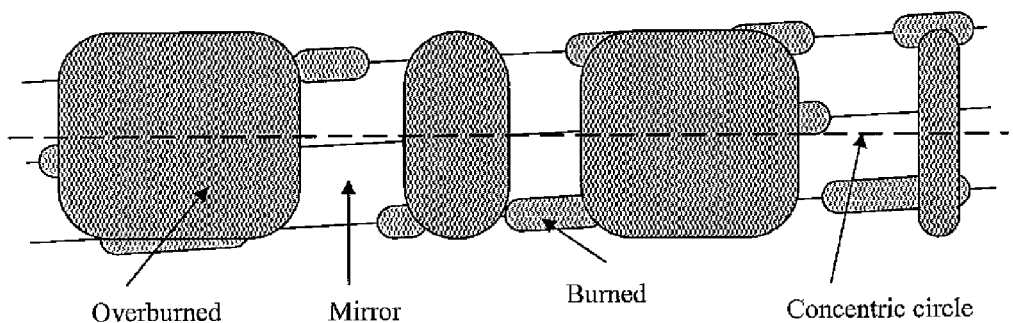

In the case where the objective lens is moved stepwise, as in the latter method, the direction of the spiral path of the track does not accurately coincide with the directions of the tangents of the concentric circle, as shown in FIG. 9. However, even in this case, the effect of overwriting data is not impaired, and control over the actuator and the sled motor can be easily achieved.

In the latter case, the amount of shifting required to locate the objective lens above the concentric circle at the next radial location depends on the size of the beam spot formed on the recording layer in a defocused state. As an example, when the size of the beam spot spans over two radially adjacent track laps, the objective lens should be shifted in steps of two track pitches.

Furthermore, according to an embodiment, the objective lens must be moved to the concentric circle at the next radial location after one or more rotations along a circle at a current radial location. In the case where the spindle motor 71 rotates the optical disc 10 at a constant angular velocity (Constant Angular Velocity mode; CAV mode), the time taken for one rotation of the disc is a time value that is fixed by the angular velocity. Accordingly, after the fixed time or longer has elapsed at the current radial location, the objective lens is moved to the next radial location.

In the case where the CAV mode is employed, the linear velocity at which the laser beam travels is proportional to the radial location of the objective lens, so that it may be necessary to increase the output power of the laser diode according to the radial location of the objective lens. The current radial location can be obtained using the number of rotations of the sled motor 72, which is accumulatively counted.

In the case where the optical disc 10 is rotated at a constant linear velocity (Constant Linear Velocity mode; CLV), the output power of the laser diode is made uniform and the rotational velocity of the spindle motor 71 is adjusted in inverse proportion to a radius corresponding to the current radial location of the objective lens, so that the rotational angular velocity is reduced in a direction from the inner circumference to the outer circumference and the time taken to move the objective lens to the next radial location (the time taken for one rotation of the disc) is increased.

When the length of the arc of a circumference corresponding to a smallest unit data block on which error correction is performed is taken into consideration, the time can be reduced by moving the objective lens to a concentric circle at the next radial location in the state in which one rotation of the optical disc 10 is not performed. The objective lens may be moved to the next radial location when the length of the arc of the concentric circle at the current radial location that is not overwritten with data, that is, the length of the arc along which the large beam spot does not travel, is smaller than the length of the arc of the smallest unit block. For this purpose, the current radial location and rotational velocity of the optical disc must be taken into account.

In an example, assuming that the range of travel in which the objective lens can be shifted alone in a horizontal direction at the location at which the optical pickup 20 is fixed includes 100 radially adjacent track laps, the servo unit 60 shifts the objective lens through 50 shifts of two radially adjacent track laps or 33 shifts of three radially adjacent track laps.

If the objective lens cannot be further shifted through, e.g., 50 shifts at step S14, the control unit 80 moves the overall optical pickup 20 in a direction from the inner circumference of the disc to the outer circumference by driving the sled motor 72 through the servo unit 60 and the driving unit 70 at step S15.

Assuming that, for example, 100 radially adjacent track laps are jumped over through one step rotation of the sled motor 72, the control unit 80 shifts the objective lens toward the innermost circumference within the range of travel while the sled motor 72 is rotated by one step, and then shifts the objective lens toward the outer circumference in steps of two radially adjacent track laps by driving the actuator that supports the objective lens.

Meanwhile, the control unit 80 estimates the approximate current radial location of the beam spot by counting the number of rotations of the sled motor 72 at step S16. Since the distance that the optical pickup 20 is moved by one step rotation of the sled motor 72, that is, the increase in radius, is fixed, the current radial location can be roughly estimated by multiplying the number of rotations of the sled motor 72, which is accumulatively counted, by the increase in radius.

Figure 10:
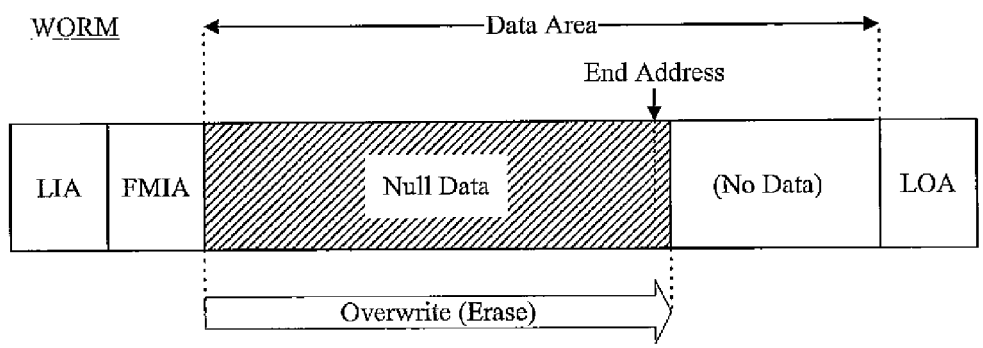
FIG. 10 shows the results of an operation of erasing data that is performed only on an area where data was actually recorded.

Furthermore, if the current radial location estimated through the above described process reaches or passes through an end address (e.g., End_Address) that is found based on the navigation information of the optical disc 10 at step S17, the control unit 80 terminates the operation of erasing data at step S18. As a result, an unnecessary operation of erasing data is not performed on the portion of the data area of the optical disc where data is not actually written, as shown in FIG. 10.

For reference, the value of the distance (the value of the increase in radius) that the optical pickup 20 moves when the sled motor 72 is rotated by one step is stored in advance in the memory 85 as an experimental value.

Figure 11:
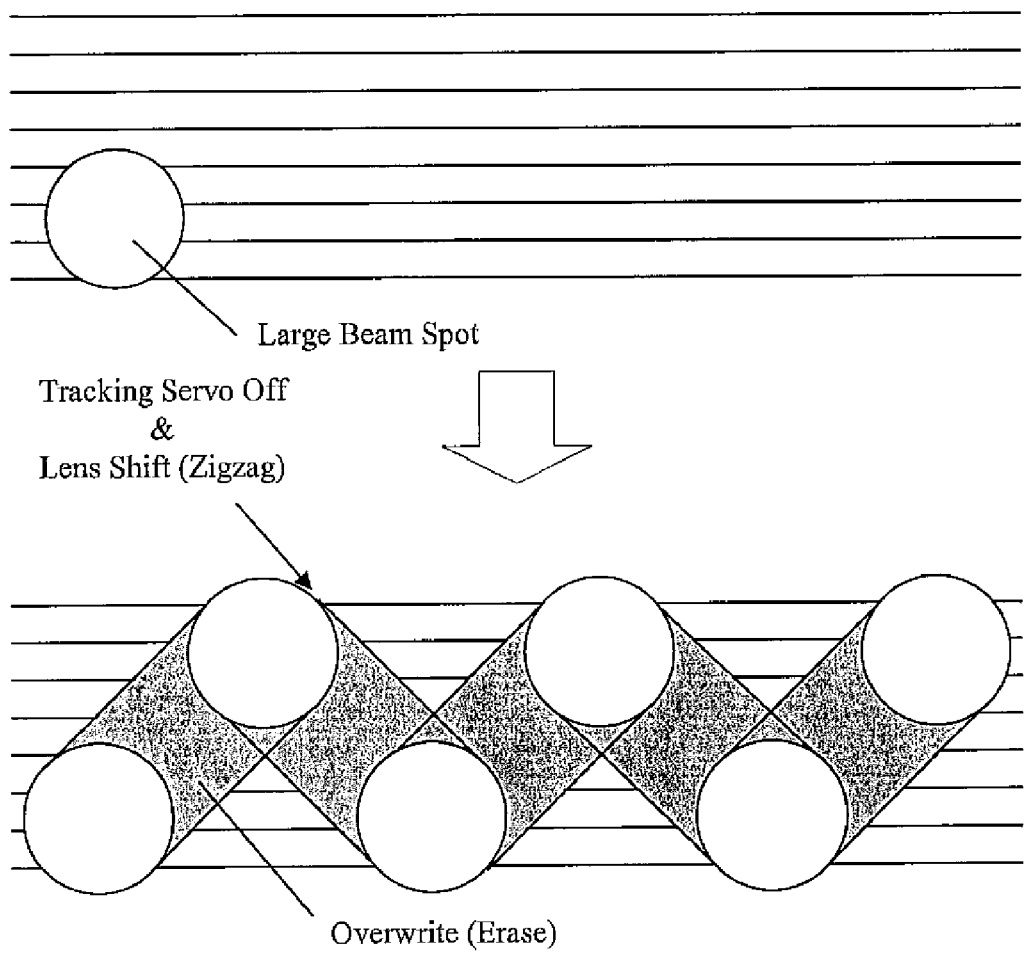
FIG. 11 shows an embodiment in which data is erased while a beam spot is moved in a zigzag manner.

A method according to another embodiment of the present invention overwrites a data area where data has been written, with arbitrary data or null data while controlling the actuator and/or the sled motor so that a beam spot having a large size spanning over a plurality of radially adjacent track laps can be moved repeatedly across radially adjacent track laps, e.g., in a zigzag manner, as illustrated in FIG. 11, instead of moving the objective lens (to be precise, the location of the beam spot) toward the outer circumference in steps of two radially adjacent track laps or three radially adjacent track laps while controlling the actuator.

Assuming that the range of travel in which only the objective lens can be horizontally shifted by the actuator at the fixed location of the optical pickup 20 is 100 radially adjacent track laps, the control unit 80 controls the servo unit 60, thereby shifting the objective lens in a zigzag manner or in another pattern (e.g., in a sinusoidal wave pattern) so that the beam spot moves across 100 radially adjacent track laps.

Figure 12:
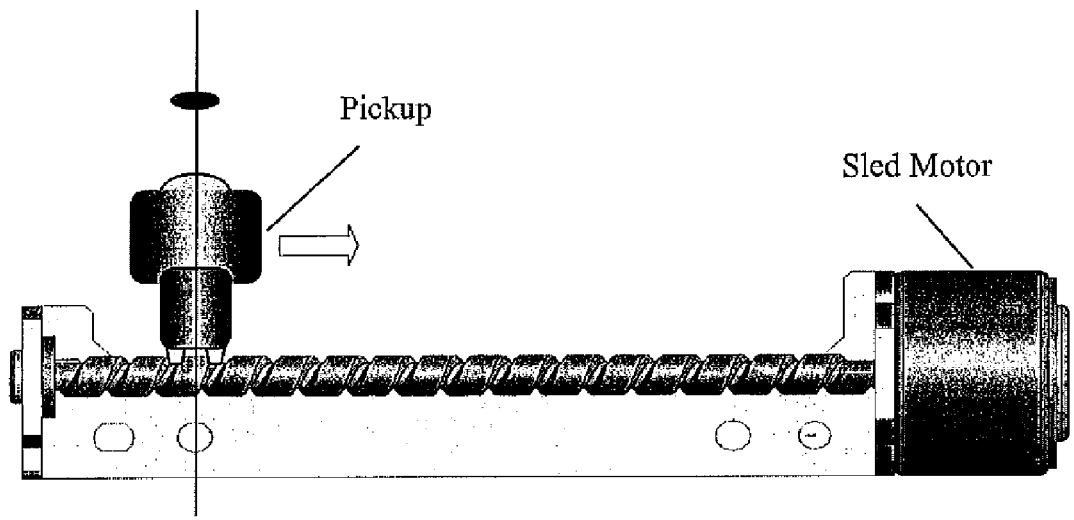
FIG. 12 shows an embodiment in which an optical pickup is moved in a direction from the inner circumference of an optical disc to the outer circumference by a sled motor.
Figure 12:
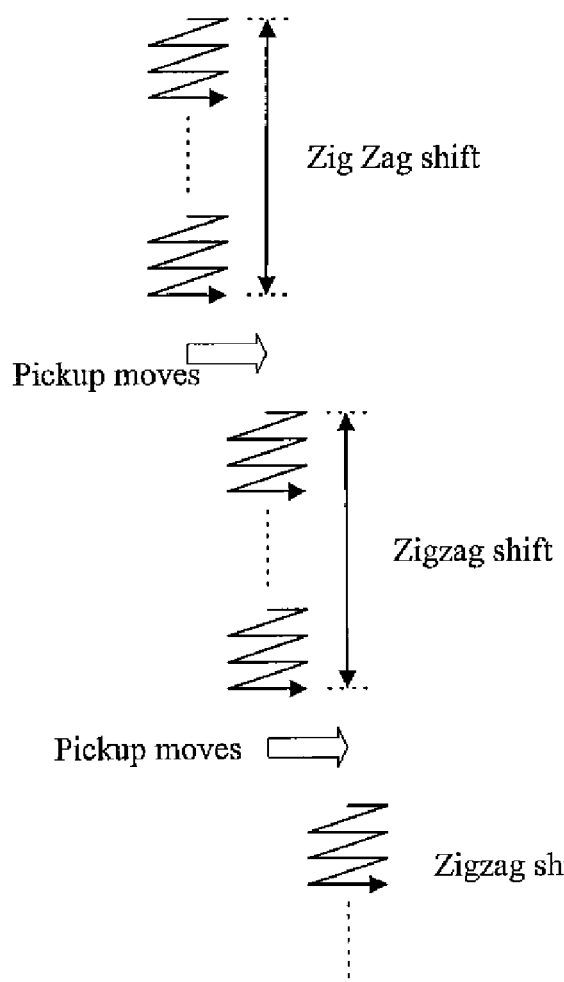

After the optical disc 10 has performed one or more rotations at the current radial location of the optical pickup 20, the control unit 80 drives the sled motor 72 through the servo unit 60 and the driving unit 70, as shown in FIG. 12, thereby moving the overall optical pickup 20 by the range of horizontal travel of the actuator in a direction from the inner circumference of the optical disc to the outer circumference.

When the optical disc 10 is rotated in a CAV mode, the velocity at which the objective lens is moved in a zigzag manner while the optical pickup 20 moves to the outer circumference can be increased so as to improve the effect of erasing data.

In a method according to another embodiment of the present invention, a data stream recorded in the data area of a disc may be deleted by overwriting with arbitrary data or null data while repeatedly moving the optical pickup across radially adjacent laps (e.g., toward the inner circumference and then toward the outer circumference) via the sled motor, instead of sequentially moving the optical pickup from the inner circumference to outer circumference. In this case the actuator, in addition, may be swung in a horizontal direction within its range of travel.

When the optical pickup is moved toward the outer circumference by the sled motor, the optical pickup can be moved to a last location at which data was actually recorded in the data area of the optical disc, based on a current radial location calculated from the accumulated number of rotations of the sled motor.

In this case, the area in which data was actually recorded may be divided into several sections, and the optical pickup may be moved to a next section after traveling between two boundaries of a current section repeatedly more than predetermined turns, until the optical pickup is moved to a section including a location at which data was last recorded.

Alternately, the optical pickup may be moved between the innermost circumstance and the location at which data was last recorded, repeatedly more than predetermined turns, without dividing the area into several sections.

The method of erasing data from an optical disc according to the present invention may be applied to an optical disc recorder such as a DVD recorder/player, or to an Optical Disc Drive (ODD) that is connected to a host such as a Personal Computer (PC), and then is used in conjunction therewith.

As a result, the operation of erasing data from an optical disc is reliably and efficiently performed, and a data stream can be prevented from being exposed unnecessarily.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of erasing data from an optical disc, comprising:
    overwriting an area of the optical disc where data has been written, with arbitrary data using a beam spot spanning over two or more radially adjacent tracks, wherein the beam spot is generated from one beam source for erasing and recording and the one beam source is moved to a next radial location after one or more rotations along a concentric circle at a radial location.

2. The method as set forth in claim 1, wherein the beam spot is formed by adjusting a location of an objective lens to a defocused location.

3. The method as set forth in claim 1, further comprising: increasing power of a laser beam generating the beam spot.

4. The method as set forth in claim 1, wherein the beam spot is moved under feed-forward control over an actuator and/or a sled motor.

5. The method as set forth in claim 4, wherein the beam spot is moved spirally and sequentially toward an outer circumference of the optical disc.

6. The method as set forth in claim 4, wherein the beam spot is moved toward an outer circumference of the optical disc in steps of beam spot size.

7. The method as set forth in claim 6, wherein the beam spot is moved to a next radial location after the optical disc has performed one or more rotations at a current radial location.

8. The method as set forth in claim 6, wherein the beam spot is moved to a next radial location in a state in which a length of an arc of a concentric circle at a current radial location that the beam spot does not travel is smaller than a length of an arc corresponding to a smallest unit data block on which error correction is performed.

9. The method as set forth in claim 4, further comprising:
if the optical disc rotates at a constant angular velocity, increasing power of a laser beam generating the beam spot in proportion to a radius corresponding to a radial location at which the beam spot is positioned as the beam spot is moved toward an outer circumference of the optical disc.

10. The method as set forth in claim 4, wherein the beam spot is moved toward an outer circumference of the optical disc within a range of travel of the actuator by the actuator, and is moved toward the outer circumference by the sled motor when the actuator is out of the range of travel.

11. The method as set forth in claim 4, wherein the beam spot is moved repeatedly across radially adjacent tracks.

12. The method as set forth in claim 11, wherein the beam spot is moved across the radially adjacent tracks within a range of travel of the actuator in a zigzag manner by the actuator, and is moved toward an outer circumference of the optical disc by the range of travel by the sled motor.

13. The method as set forth in claim 12, wherein, if the optical disc rotates at a constant angular velocity, a velocity at which the beam spot is moved in a zigzag manner is increased as the beam spot is moved toward the outer circumference.

14. The method as set forth in claim 10, further comprising:
calculating a current radial location based on an accumulated number of rotations of the sled motor; and
if the current radial location has passed through a location at which data was last recorded, terminating the overwriting operation.

15. The method as set forth in claim 14, wherein the location at which data was last recorded is searched for in navigation information of the optical disc.

16. The method as set forth in claim 12, further comprising:
calculating a current radial location based on an accumulated number of rotations of the sled motor; and
if the current radial location has passed through a location at which data was last recorded, terminating the overwriting operation.

17. The method as set forth in claim 11, wherein the beam spot is moved repeatedly across radially adjacent tracks by the sled motor.

18. The method as set forth in claim 17, wherein the beam spot is moved repeatedly in a horizontal direction within a range of travel of the actuator by the actuator.

19. The method as set forth in claim 17, wherein the beam spot is moved toward an inner circumference of the optical disc after being moved to a location at which data was last recorded, based on a current radial location calculated from an accumulated number of rotations of the sled motor.

20. The method as set forth in claim 17, further comprising:
terminating the overwriting operation after the beam spot is moved repeatedly more than predetermined turns.

21. The method as set forth in claim 1, wherein the optical disc is a Write Once Read Many (WORM) disc.

22. A device for erasing data from an optical disc, comprising:
an optical pickup; and
a controller configured to control the optical pickup to overwrite an area of the optical disc where data has been written, with arbitrary data using a beam spanning at least two radially adjacent tracks, wherein the beam spot is generated from one beam source for erasing and recording and the one beam source is moved to a next radial location after one or more rotations along a concentric circle at a radial location.

23. The device as set forth in claim 22, wherein the beam spot is formed by adjusting a location of an objective lens of the optical pickup to a defocused location.

24. The device as set forth in claim 22, wherein the beam spot is moved under feed-forward control over an actuator and/or a sled motor.

* * * * *